JOHN H. SHAW.
Improvement in Clevises.

No. 115,113.　　　　　　　　　　　　Patented May 23, 1871.

Witnesses.　　　　　　　　　　　　　　Inventor.

115,113

UNITED STATES PATENT OFFICE.

JOHN H. SHAW, OF INLET, ILLINOIS.

IMPROVEMENT IN CLEVISES.

Specification forming part of Letters Patent No. 115,113, dated May 23, 1871.

I, JOHN H. SHAW, of Inlet, in the county of Lee and State of Illinois, have invented certain Improvements in Clevises, of which the following is a specification:

The nature of said improvements consists in constructing a clevis so that all the parts necessary to its use are connected together so as to obviate the possibility of loosing the pin, (as is often the case,) also to save time and prevent accident.

In the accompanying drawing the various parts are fully represented; and

To enable those skilled in the art to which my invention relates the better to understand and to construct the same, I will describe it more fully.

Figure 1:
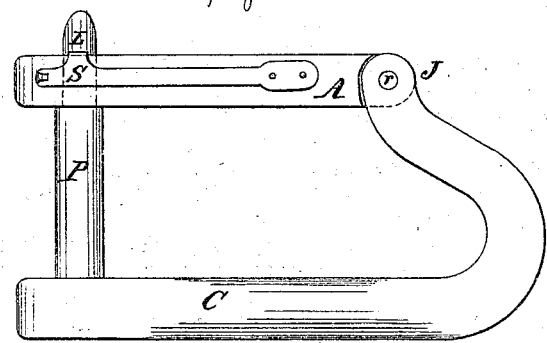

Figure 1 represents the clevis complete in the position in which it is used.

C and P represent the clevis proper and the pin formed of one piece, and are, therefore, inseparable. The upper arm A of the clevis is connected to the part C by a joint, as shown at J, and is secured by means of the rivet $r$, (any form of joint may be used,) or its equivalent, and to retain the arm A in position, and thus secure the clevis in its place. It is provided with a spring, S, properly secured by rivets or otherwise, and is provided with a lip, L, as shown in Figs. 1, 2, and 3, which lip L projects over the top of the arm A and into a notch, $n$, in the pin P, (which notch is shown at $n$ in Fig. 2,) and thus the whole is secured in position.

Figure 2:
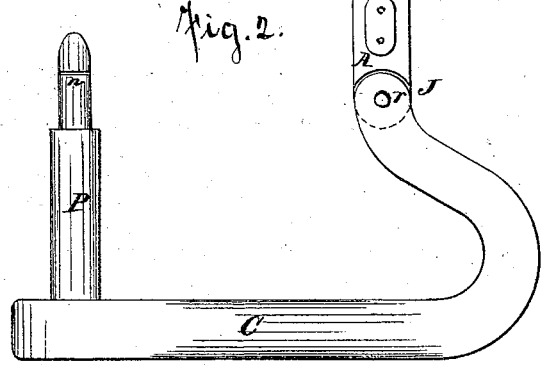

Fig. 2 represents the arm A turned up for the purpose of attaching or detaching the clevis.

Figure 4:
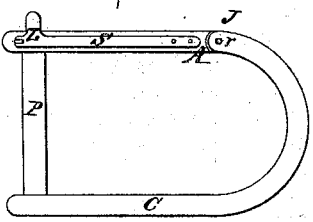
Figure 5:
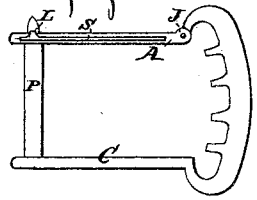

The short sweep of the clevis C, as shown in Figs. 1 and 2, is designed for the purpose of bringing the draft near the bottom of the clevis and thus lighten the strain on the joint J. But the principle may be applied with equal advantage to a clevis with a full sweep, as in Fig. 4, and the joint made sufficiently strong to resist any strain that the clevis will stand. It may also be applied to a plow-clevis, as in Fig. 5. In short, it is applicable to any of the purposes for which a clevis can be used.

Figure 3:
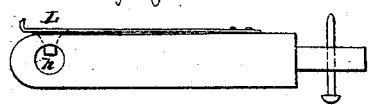

Fig. 3 represents the arm A with the rivet $r$ detached from the piece C for the purpose of giving an edge view of the spring S with its lip L as it projects over the hole $h$, which hole is elongated for the purpose of allowing the pin P to enter freely. The point of the pin P is also slightly tapered for the same purpose.

The operation of attaching the clevis is performed as follows: The arm A is thrown up, as in Fig. 2, and when the clevis is in position the arm A is again brought down in the position of Fig. 1, as the pin P enters the hole $h$; the lip L, coming in contact with the rounded or beveled end of the pin P, the spring S is crowded back until the arm A reaches its position, when the lip L enters the notch $n$ and all is securely held together. To remove the clevis the spring S is held back with the thumb or finger, the arm A thrown up, as in Fig. 2, when the clevis may be removed, and all done with one hand.

The advantages of my improvement are obvious, and may be expressed in four words, viz: convenience, economy, expedition, and safety.

Having thus described my invention, what I claim as new, and desire to secure by Letters Patent, is—

The combination of the parts C, P, A, and S, all arranged as and for the purpose described.

JOHN H. SHAW.

Witnesses:
HENRY E. WYLIE,
SIMON BADGER.